United States Patent [19]

Lundy

[11] 4,043,772
[45] Aug. 23, 1977

[54] VENTURI SCRUBBER WITH VARIABLE AREA THROAT

[75] Inventor: Alvin S. Lundy, West Bloomfield, Mich.

[73] Assignee: Schneible Company, Holly, Mich.

[21] Appl. No.: 629,777

[22] Filed: Nov. 7, 1975

[51] Int. Cl.² ............................................. B01D 47/10
[52] U.S. Cl. ...................................... 55/220; 55/226; 261/DIG. 56
[58] Field of Search .................... 55/220, 226; 261/62, 261/DIG. 54, DIG. 56; 138/43–46; 251/308

[56] References Cited

U.S. PATENT DOCUMENTS

| | | | |
|---|---|---|---|
| 2,919,885 | 1/1960 | Daigle | 251/308 |
| 3,189,332 | 6/1965 | Rehmus | 138/45 |
| 3,284,064 | 11/1966 | Kolm et al. | 55/226 |
| 3,285,522 | 11/1966 | Salisbury | 261/DIG. 54 |
| 3,556,489 | 1/1971 | Ueda | 261/DIG. 54 |

FOREIGN PATENT DOCUMENTS 1,807,803  6/1970  Germany ..................... 261/DIG. 54

Primary Examiner—Frank W. Lutter
Assistant Examiner—David L. Lacey
Attorney, Agent, or Firm—Tilton, Fallon, Lungmus, Chestnut & Hill

[57] ABSTRACT

A wet gas venturi scrubber having a rotor for selectively adjusting the cross-sectional area of the venturi throat to suit different operating requirements and conditions. The rotor is disposed directly in the throat and includes a plurality of spaced parallel members secured to a transverse adjustment shaft and adapted to be shifted into any selected position between a first position wherein the members are parallel with the direction of flow and a second position wherein such members traverse the direction of flow.

8 Claims, 6 Drawing Figures

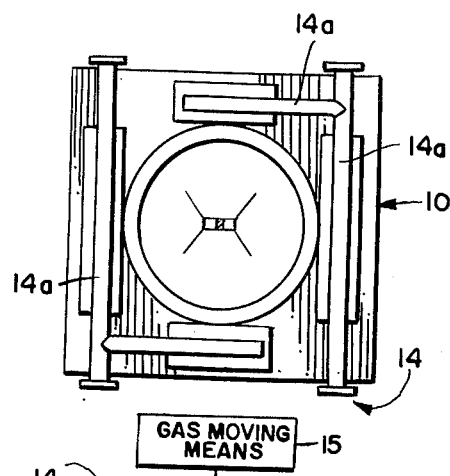
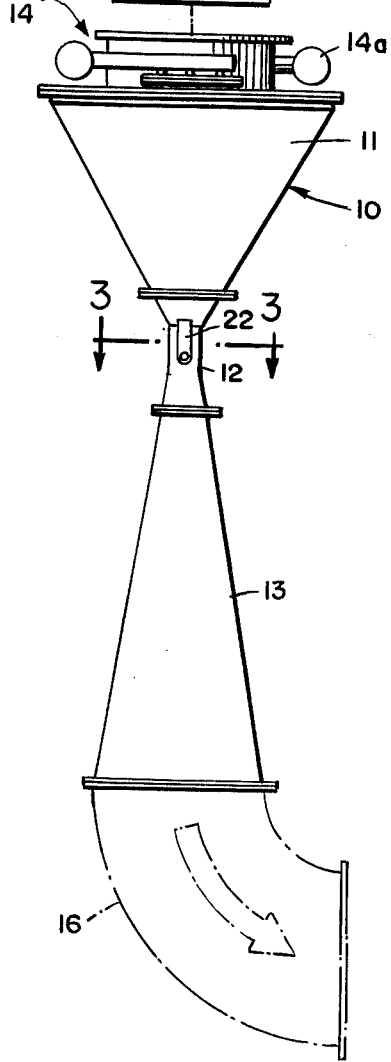

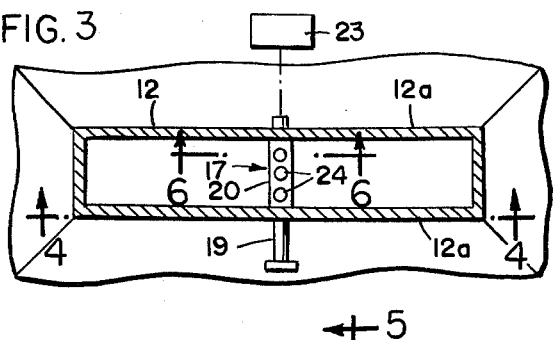
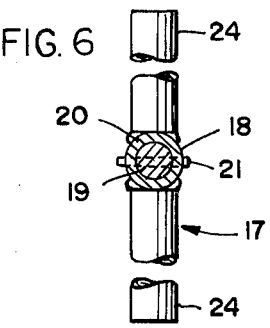
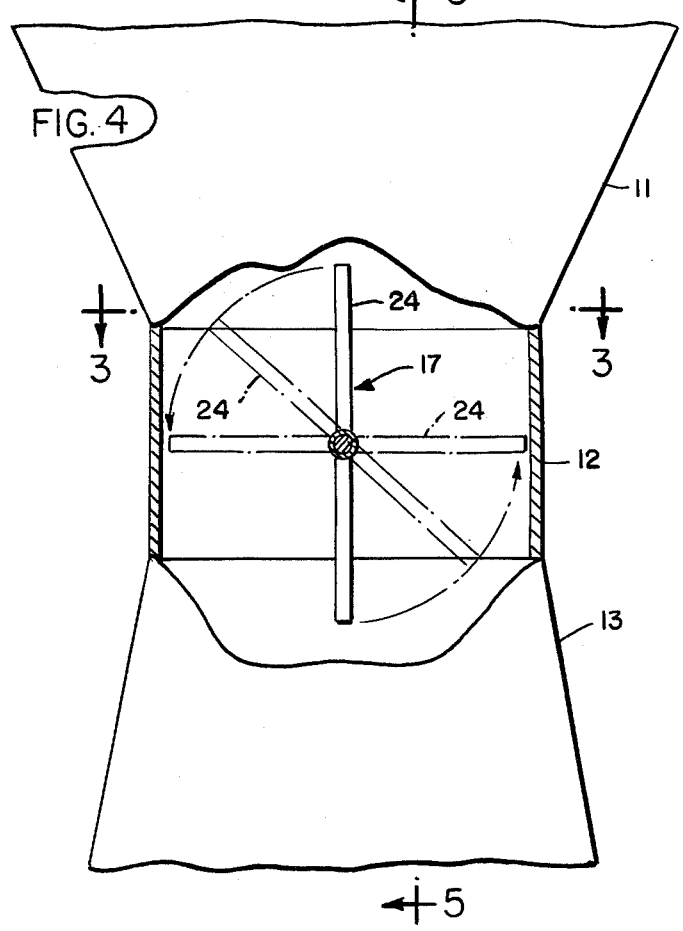
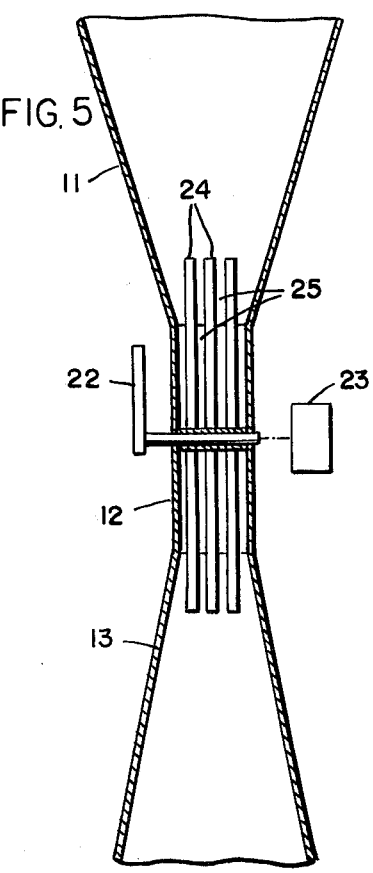

VENTURI SCRUBBER WITH VARIABLE AREA THROAT

BACKGROUND AND SUMMARY

The use of venturi gas scrubbers is well known, as disclosed, for example, in co-owned U.S. Pat. No. 3,048,956. A stream of gas (air), contaminated with fine particulates, enters the venturi and increases markedly in linear velocity. A wash liquid (water) is injected into the accelerating gas stream to effect intimate contact between the particles and liquid droplets. The particles are thereby wetted and entrapped by the liquid droplets by the difference in velocity between the particles and the liquid droplets.

Various methods are also known for altering the cross-sectional area of the throat of a venturi-type gas scrubber in response to changes in operating conditions. In U.S. Pat. No. 3,556,489, a venturi scrubber is disclosed in which the gas velocity in the throat may be maintained at a relatively constant level, by adjusting the throat area, despite changes in inlet volumes and pressures.

One aspect of the present invention is to provide an improved means for altering the cross-sectional throat area of a venturi scrubber, such means being relatively simple in structure and operation and having the important advantages of reduced deflection, abrasion, balanced pressure, and turbulence. Specifically, it is an object to provide flow restricting means which is operable to reduce the throat area of a venturi tube without completely blocking the flow of gas, particulates, and atomized liquid through the main or central portion of the throat.

In brief, the scrubber includes a venturi tube having a throat with a substantially rectangular cross-sectional area. A rotor is mounted in the throat for rotational movement about an axis normal to the direction of gas flow. The rotor comprises a plurality of parallel members disposed in laterally spaced relation and transversely bisected by the pivot line of the rotor. In the best mode presently known for practicing the invention, each member has rounded side surfaces and preferably takes the form of a cylindrical bar.

Even when the rotor is positioned so that the bars extend across the throat, gas may flow at high velocity through the spaces between the parallel bars. Minimum obstruction and maximum cross-sectional area are produced when the rotor is turned 90 degrees to position the bars parallel with the longitudinal axis of the throat. In any selected intermediate positions (between such longitudinal and transverse positions), high velocity gas may flow about the ends of the bars as well as between such bars. Thus, since gas may flow between the bars regardless of the position of the rotor, the extent of deflection that would otherwise be produced if the rotor were solid or imperforate is avoided, the impacting of entrained particulates upon the rotor and throat surfaces is reduced, wear upon such throat surfaces and rotor is minimized, and the force of the gas stream is equal on each side of the axis, reducing the torque required for revolving the rotor.

Other advantages and objects of the invention will become apparent from the specification and drawings.

DRAWINGS

FIG. 1 is a top plan view of a venturi-type scrubber embodying the variable area throat mechanism of this invention.

FIG. 2 is a side elevational view of the scrubber. FIG. 3 is an enlarged fragmentary cross sectional view taken along line 3—3 of FIG. 2.

FIG. 4 is a sectional view taken along line 4—4 of FIG. 3.

FIG. 5 is a vertical sectional view taken along line 5—5 of FIG. 4.

FIG. 6 is a further enlarged fragmentary vertical sectional view of the rotor taken along line 6—6 of FIG. 3.

DESCRIPTION

In the drawings, the numeral 10 designates the venturi assembly of a wet gas scrubber, the venturi assembly including a tapered inlet section 11, a narrowed throat section 12, and an outwardly flared outlet section 13. A liquid injection assembly 14, equipped with manifolds 14a, communicates with the entrance portion of the venturi passage to introduce a scrubbing liquid, normally water, into the venturi. The gas to be cleansed of its particulates and other impurities is introduced under pressure or suction by means of blower 15 (FIG. 2) or other suitable gas moving means. Because of the progressive narrowing of the inlet portion, the linear velocity of the gas increases so as to effect intimate contact between the liquid and the gas. Fine dust particles are thereby wetted and are collected along with the scrubbing liquid. It will be observed that the outlet section connects with an arcuate portion 16 to convey wetted particulates, gas and liquid to a suitable liquid entrainment separator.

Referring to FIGS. 3-6, it will be observed that throat 12 is generally rectangular in cross sectional configuration and contains a rotor adapted to pivot about an axis normal to the direction of flow through the throat. Specifically, the rotor includes a pivot shaft assembly 18 which, in the illustration given, comprises a shaft 19 and a sleeve 20. The shaft extends through openings in opposite side walls 12a of the throat and is journaled in such openings. A pin 21, or other suitable connecting means, releasably secures the sleeve and shaft together so that the parts may be disassembled for repair and replacement. A lever or handle 22 is secured to one end of the shaft and external to the venturi to permit selective rotation of the shaft assembly 18 into any selected position of adjustment. Locking means 23, diagrammatically shown in FIGS. 3 and 5, are provided for frictionally securing the shaft in any selected position of adjustment. If desired, the locking means and shaft may be operatively coupled to any conventional device for sensing pressures, flow rates, opacities, or other conditions, and for adjusting the rotor to increase or decrease the cross-sectional area of the throat.

As shown in the drawings, the rotor also includes a plurality of spaced parallel members or bars 24 which are secured to the sleeve 18 and which are arranged perpendicular to the pivot shaft assembly. The bars 24 all extend along the same plane and may be shifted by rotation of shaft 19 into any selected angular position between a first position (illustrated in solid lines in FIG. 4) wherein the bars extend longitudinally of the throat, and a second position wherein such bars extend transversely with regard to the direction of flow.

Preferably, the bars 24 are cylindrical in configuration, providing rounded surfaces for directing the flow of air through the spaces 25 between such bars. The number of bars and spaces may vary considerably, depending on the size and capacity of the installation. It is to be observed, however, that the spaces 25 are of substantial width in relation to the diameter of the bars and that even when the rotor is positioned so that the bars extend transversely, such spaces allow a substantial flow through the throat.

As an illustrative example, effective results have been achieved with an assembly substantially as illustrated wherein the throat 12 has internal dimensions of approximately 3.5 by 20.5 inches, the bars of the rotor are approximately 0.75 inches in diameter, and the maximum longitudinal dimensions of the rotor (measured from opposite ends of aligned bars) is approximately 19 inches. The result is a venturi having a maximum throat area (with the bars extending longitudinally) of approximately 0.470 square feet, and a minimum cross-sectional area (with the bars extending transversely) of approximately 0.198 square feet. Such proportions and dimensions may, of course, be varied widely depending upon gas volume and pressure drop requirements.

While in the foregoing I have disclosed an embodiment of the invention in considerable detail for purposes of illustration, it will be understood by those skilled in the art that many of these details may be varied without departing from the spirit and scope of the invention.

I claim:

1. A wet gas venturi scrubber comprising a venturi tube having a gas inlet and a gas outlet and defining a narrowed throat therebetween, gas moving means for moving a stream of gas through said tube, and liquid injection means for injecting a cleansing liquid into said gas upstream of said throat, wherein the improvement comprises a rotor disposed in said throat and including a transverse pivot shaft extending between opposite sides of said throat and mounted for rotation about the axis thereof, said rotor also including a plurality of spaced parallel members being disposed within said throat and being perpendicular with and secured to said shaft, said rotor having spaces between said members of substantial width in relation to the width of said members and being rotatable into any selected angular position between a first position permitting a maximum flow through said throat wherein said members extend longitudinally of said throat and a second position permitting a minimum flow through said throat wherein said members extend transversely of said throat, said spaces permitting a substantial flow through said throat even when said rotor is in said second position.

2. The scrubber of claim 1 in which said members comprise a plurality of straight bars of generally circular cross-sectional configuration.

3. The scrubber of claim 1 in which said throat is generally rectangular in cross-sectional configuration.

4. The scrubber of claim 1 in which said pivot shaft comprises a shaft element extending through said throat and a sleeve mounted upon said shaft and disposed within said throat, said members being permanently secured to said sleeve.

5. The scrubber of claim 4 in which said shaft element is rotatably journaled in said side walls and said sleeve is detachably secured to said shaft element.

6. The scrubber of claim 5 in which handle means is disposed externally of said throat and secured to said shaft element for rotating said members into selected positions of adjustment.

7. The scrubber of claim 6 in which means are provided for fastening and releasably holding said shaft in any selected position of rotational adjustment.

8. The scrubber of claim 1 in which said members are straight and lie along a single plane.

* * * * *